Nov. 10, 1942.  J. H. WILSON  2,301,600
CLUTCH MECHANISM
Filed April 18, 1940  2 Sheets-Sheet 1
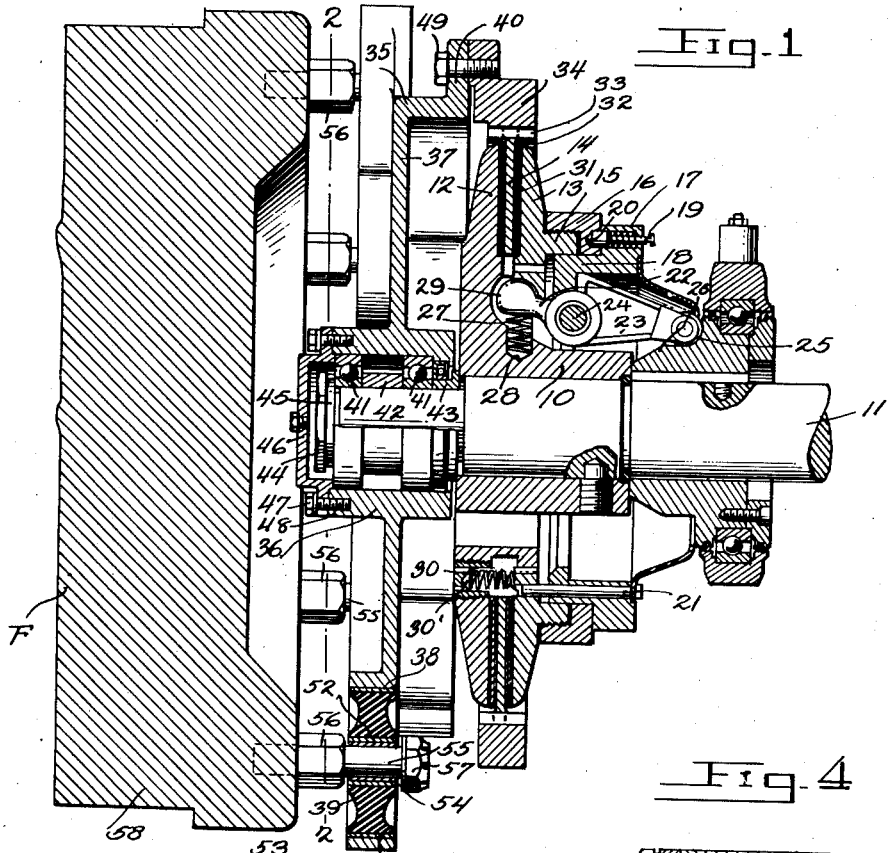
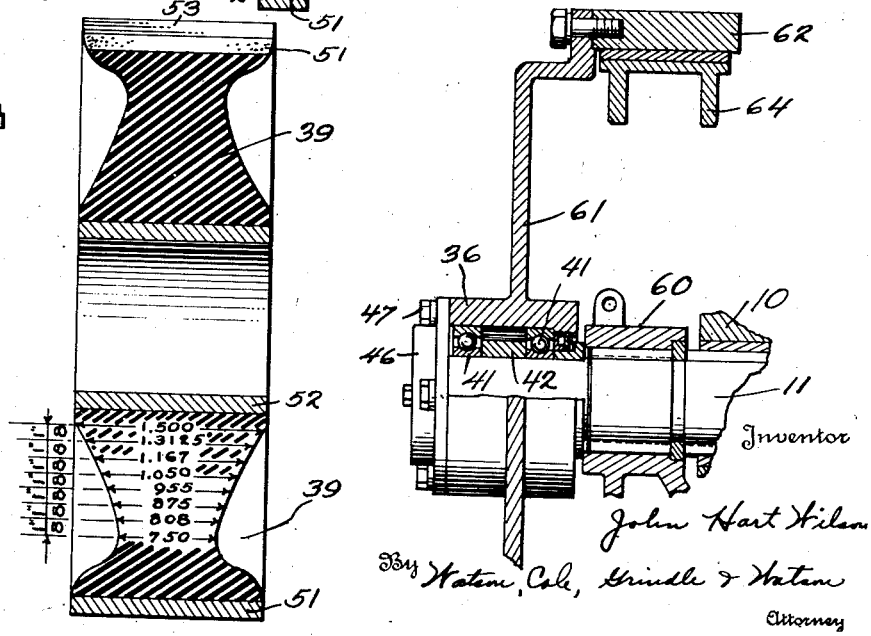
Inventor
John Hart Wilson
By Watson, Cole, Grindle & Watson
Attorney

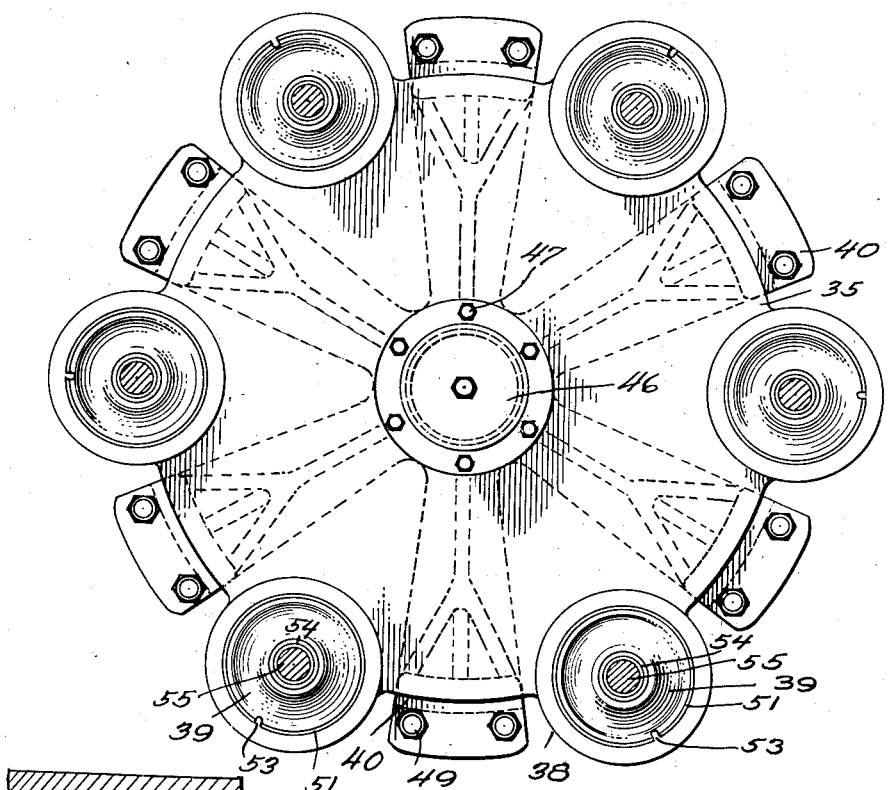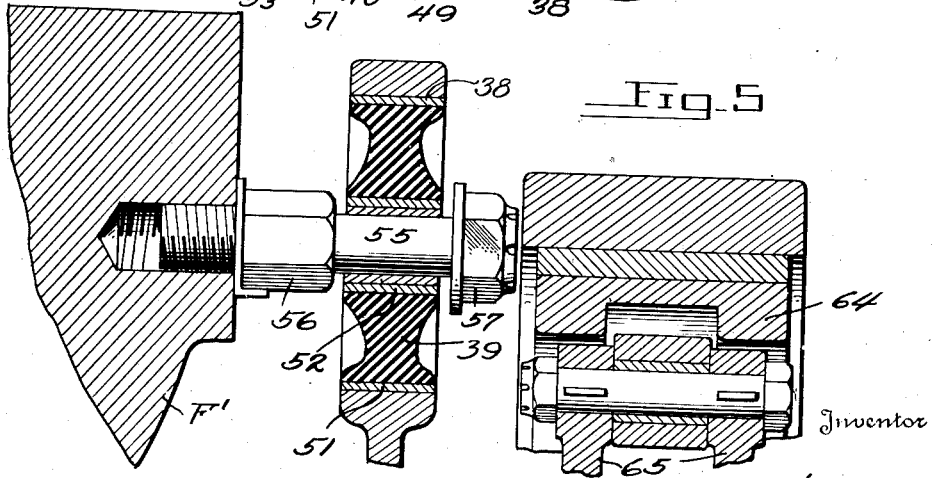

Patented Nov. 10, 1942

2,301,600

UNITED STATES PATENT OFFICE 2,301,600

CLUTCH MECHANISM

John Hart Wilson, Wichita Falls, Tex.

Application April 18, 1940, Serial No. 330,392

7 Claims. (Cl. 192—68)

This invention relates to clutch mechanisms which include means for compensating or eliminating the effects of end play and misalignment of the driving and driven shafts, and eliminating jars and shocks and other effects due to torque variation.

Misalignment of driving and driven shafts which are clutched together causes undue wear on the shaft bearings and often on the main bearings of the driving unit and, generally speaking, machines cannot economically be built sufficiently ruggedly to withstand this destructive effect. Shocks and jars which are transmitted to a shaft due to sudden variations in torque are taken up sharply and very often cause the shaft to break. When a piston driven engine is used as a power source, power is delivered to the crankshaft in a series of pulsations and is transmitted to a driven shaft in corresponding beats, the connecting means between the driving and driven shafts being required to take up most of the strain caused by the intermittent delivery of power. All these factors tend to shorten the useful life of the entire machine and it has been realized that, by providing shock absorbing means between the driving and driven elements, smoothness of operation will be promoted, wear of the bearings reduced, and the entire unit reduced in weight.

Previous attempts have been made to solve this problem, one suggestion being to mount a shock absorbing means on a flywheel on the driving shaft and to support a friction member on the shock absorbing means, which member is engageable by cooperating friction surfaces rotatable with the driven shaft. This suggestion, however, proved to be of no practical value because, at high speeds, the resiliently mounted friction member moved to an off-center position relative to the engaging elements on the driven shaft, and transmitted the off-center rotation to both shafts, causing excessive strain on all the bearing parts.

The principal object of this invention is to provide a clutch mechanism including means which will completely avoid the effects due to misalignment of the driving and driven shafts and reduce the wear on all bearing elements.

Another object of this invention is to provide a clutch mechanism with a bearing mounted member between the driving and driven elements, which member is provided with resilient elements and which is adapted to drivably connect the elements.

A further object of this invention is to provide a clutch mechanism with a bearing mounted member which is adapted to support one friction surface, engageable by the friction elements on the driven shaft, in concentric relation with these elements.

Numerous additional objects and advantages of the invention will be apparent from the following description made with reference to the accompanying drawings, in which:

Figure 1 is an axial section through a clutch mechanism provided with resilient means of the type described, the clutch being shown as engaged;

Figure 2 is a section on line 2—2 of Figure 1;

Figure 3 is an axial section through one of the annular resilient devices; and

Figures 4 and 5 are partial axial sections, taken on different planes, through a clutch of the internal expanding type which also embodies the invention.

In the drawings are shown two types of clutches, one being of the disc type and the other of the internal friction-shoe type. While of general utility, these clutches may be used with great advantage to operatively connect engine driven flywheels, such as those indicated at F in Figure 1 and at F' in Figure 5, to relatively smaller shafts to be driven.

The hub 10 of the clutch shown in Figure 1 is fixed on the driven shaft 11, and is formed with an annular flange 12 which acts as a clamping plate adapted to cooperate with the axially movable clamping plate 13 to engage the intermediate clutch plate 14. The clamping plate 13 is formed with a flange 15 on which is threaded an adjustable ring 16. A ring, 17, formed with an internal flange 18, is mounted on ring 16 and is held against rotation with respect to this ring by a spring-held index pin 19 which is received in any one of a plurality of circumferentially arranged pockets 20 in the adjusting ring, and against rotation relative to the clamping plate by a series of circumferentially spaced pins 21.

The internal flange 18 is adapted to be engaged by an arm 22 of the pivotally mounted clutch operating lever 23 which is supported on the hub 10 by the pin 24. There are several such clutch levers, although only one is shown. The operated end of the clutch lever carries a roller 25 which moves on the cam surface of the collar 26, the axial movement of which causes the clutch to engage or disengage. The disengaging movement is aided by the action of the spring 27 which is set in the pocket 28 and abuts against the arm 29, and by a series of springs 30 set in the pockets 30' in the hub 10 and bearing against the movable clamping plate, all of which force the clutch lever 23 in disengaging direction when the operating force is removed. The clutch plate 14 is provided with frictional facings 31 on both sides and with a plurality of teeth 32 around the periphery which intermesh with the internal teeth 33 of a clutch driving ring 34 and prevent rotary motion of the clutch plate relatively to the driving ring while allowing an axial movement which eliminates frictional drag when the clamping plate 13 is moved to its disengaged position. The driving ring is bolted or otherwise rigidly secured to the clutch driving disc or spider 35.

The clutch driving disc 35 has a hub 36 and is provided with a concentric series of circular openings 38, adapted to receive resilient members 39. Alternating with openings 38 are attachment flanges 40 by which the clutch driving ring 34 is secured to the disc 35. The hub 36 is supported on the driven shaft 11 by the ball races 41 which are spaced by the bushing 42 and held against axial displacement by the bushing 43 and the end nut 44 and washer 45. A hub cap 46 covering the hub opening is held in position by a series of threaded bolts 47 received in the openings 48.

Details of the driving disc 35 are illustrated in Figure 2 in which six resilient elements are shown arranged alternately with six connecting flanges circumferentially around the disc. The flanges are displaced laterally from the body of the disc so that the friction disc can be supported by the flanges in its conventional position intermediate the friction elements rotating with the driven shaft without modifying the usual structure of these elements. When the clutch driving ring is mounted on flanges so formed, the clutch disc 14 is spaced from the clutch driving disc sufficiently to allow the interpositioning of the clamping plate 12 between the disc 35 and the clutch plate, without modifying the conventional structure of this type of clutch.

The resilient elements 39 may be pneumatic devices but are preferably made solidly and of resilient material such as rubber. A preferable design of one of these elements is shown in Figure 3 in which the rubber element is so formed in radial section that the product of the width of the element at any point where decimal dimensions are given and the distance to the center of the element from that point is constant. This construction ensures that the rubber is equally stressed throughout when the element is placed under radial load, and hence constant or equal elasticity within this portion of the element, to give maximum flexibility for a given diameter.

The periphery of each annular rubber element is encircled by a cylindrical metal member 51 which is split at one point and a recess 53 is formed in the rubber at the break to allow a contraction of the circumference of the element to facilitate insertion of the element into the opening in the clutch driving disc. An inner cylinder or liner 52 closely encircles an oilless bushing 54 mounted on a stud 55 which is received in the threaded hole in the flywheel F.

When the mechanism described is in operation, the power delivered to the flywheel is transmitted to the driving disc 35 through the studs 55 and the resilient elements 39. As the disc rotates on the shaft 11 it carries with it the rigidly connected driving ring 34 in which the clutch plate 14 is mounted for minor axial or swinging movements. When the clutch is to be engaged, the collar 26 is moved axially toward the clutch plate and the roller 25 on the clutch lever moves up the surface of the collar and causes the arm 22 to move the clamping plate into engagement with the clutch disc through the force which the arm exerts on the internal flange 18. Due to the fact that the intermediate friction disc is constrained to revolve at all times about the same axis as the clamping plates, clutching engagement and disengagement may be effected with the greatest ease. Also, because there is no portion of the clutching mechanism which is resiliently mounted no part can move to an eccentric position while the clutch is in operation, and cause destruction of the shaft bearings. Likewise, strains due to intermittent delivery of power from the flywheel, torque variation, and jars will be taken up in the resilient elements without affecting the center of rotation of the clutch disc relative to the clamping plates and consequently it is possible to engage the clutch at high speed without causing any irregularity in the operation.

In the form of the invention illustrated in Figures 4 and 5 the same general arrangement is maintained—the flywheel F' being connected to the driven shaft 60 through a driving disc 61 mounted on bearings supported on the driven shaft, clutch means being provided to operatively connect the driving disc to the driven shaft. However, the clutch is of the internal friction shoe type instead of the disc type, having a cylindrical drum 62 bolted to the driving disc 61 as shown in Figure 4, against the inner surface of which brake shoes, as indicated at 64, may be brought to bear, the brake shoes being pivoted on a spider keyed to the shaft, portion of the spider being indicated at 65. The driving disc 61 is connected to the flywheel through a plurality of resilient elements as before, one of these being shown in section in Figure 5. By the arrangement shown, jerking and violent vibration of the driving and driven shafts upon application of the clutch is eliminated, and likewise smooth and vibrationless running of the clutch, after engagement is assured.

The resilient element used, shown in radial section in Figure 3, is particularly advantageous in a clutch construction of the type illustrated. As in the case of the design of a bearing, the unit stress on the rubber is obtained by dividing the total pressure imposed thereon by the projected area of the shaft or, in other words, the area obtained by multiplying the shaft diameter by the length of the bearing. In the case of an annulus of uniform radial section the unit stress in the rubber will decrease from the inner to the outer fibers. To make this pressure constant at various distances from the axis the width must be decreased as the distance from the axis increases, the product of width times diameter remaining constant. In the case of the annulus shown in Figure 3, the fiber stress in the rubber will be uniform from the ring 52 outwardly for the distance of an inch, measured radially, or to the place where the thickness of the member is .750 inch. Outwardly of this the section is increased gradually to provide an outer cylindrical surface of substantial area, which may be secured to the ring 51. Inwardly of the smallest section therefor the rubber will be equally stressed at all points and will be uniformly deflected under stress.

The invention may be applied to clutch constructions of widely differing designs, as will be apparent, of which the two specifically illustrated and described are given by way of example only.

Having thus described the invention, what is claimed as new and desired to be secured by Letters Patent is:

1. In a clutch construction, the combination with substantially aligned driving and driven members of a driving disc mounted for rotation about a fixed axis, said disc having a circular series of pockets equidistantly spaced from said axis and a circular series of attachment elements also equidistantly spaced from said axis, the pockets and elements alternating, resilient means retained in each of said pockets and forming portion of a connection between said disc and one of said members, said elements forming portions of a connection between said disc and the other of said members.

2. In a clutch construction, in combination, a connecting means between the driving and driven members which comprises a driving disc mounted for rotation about a fixed axis, a circular series of attachment elements on said disc and arranged concentrically about its axis of rotation, alternate elements being resilient and intermediate elements being nonresilient, the resilient elements being adapted to be connected to one of said members and the other elements to the second of said members.

3. The combination set forth in claim 2 in which the resilient elements are annular and are seated in cylindrical pockets and the alternating elements are attachment flanges integral with said disc.

4. The combination set forth in claim 2 in which the resilient elements are annular and each, in radial section, varies in width, its minimum width being intermediate its inner and outer cylindrical surfaces, for the purpose set forth.

5. The combination set forth in claim 2 in which the resilient elements are annular and each, in radial section, varies in width, its minimum width being intermediate its inner and outer cylindrical surfaces, the product of the width of the element at a certain point, and the diameter at said point, being constant.

6. In a clutch mechanism, two members to be operatively connected or disconnected, said members being supported independently of each other for rotation about substantially aligned axes, a driving disc mounted on one of said members for rotation about the axis of said member, means flexibly connecting said driving discs to the other of said members, a friction element carried by said disc, and means mounted on and rotatable with that member which supports the driving disc, for frictionally gripping the friction element, said last mentioned means including clamping plates for engaging opposite faces of the friction element, one of said clamping plates being interposed between said disc and friction element.

7. In a clutch construction, in combination, independently supported substantially coaxial driving and driven members, a driving disc rotatably mounted on the driven member and resiliently connected to the driving member, relatively movable clamping plates also carried by and rotatable with the driven member, and an annular friction plate the outer edge of which is detachably secured to said driving disc and the body of which is interposed between said clamping plates.

JOHN HART WILSON.